United States Patent [19]
Araki

[11] Patent Number: 5,278,659
[45] Date of Patent: Jan. 11, 1994

[54] SHUTTER SPEED CONTROL CIRCUIT FOR AN IMAGE PICK-UP APPARATUS

[75] Inventor: Shoji Araki, Kanagawa, Japan

[73] Assignee: Sony Corporation, Tokyo, Japan

[21] Appl. No.: 799,196

[22] Filed: Nov. 27, 1991

[30] Foreign Application Priority Data

Nov. 28, 1990 [JP] Japan .................. 2-327850

[51] Int. Cl.$^5$ ............ H04N 3/14; H04N 5/335/5/238
[52] U.S. Cl. ..................... 358/213.19; 358/213.13; 358/228
[58] Field of Search ............... 358/213.13, 213.19, 358/211, 228; 354/435

[56] References Cited

U.S. PATENT DOCUMENTS

| | | | |
|---|---|---|---|
| 4,541,016 | 10/1985 | Ochi et al. | 358/213.13 |
| 4,872,057 | 10/1989 | Woolfolk | 358/211 |
| 4,965,671 | 10/1990 | Dielhof | 358/213.13 |
| 5,051,833 | 9/1991 | Tsuji | 358/213.13 |
| 5,093,716 | 3/1992 | Kondo et al. | 358/213.19 |
| 5,093,727 | 3/1992 | Kakinuma et al. | 358/211 |
| 5,157,502 | 10/1992 | Nakajima et al. | 358/213.13 |

*Primary Examiner*—Michael T. Razavi
*Assistant Examiner*—Wendy R. Greening
*Attorney, Agent, or Firm*—Hill, Steadman & Simpson

[57] ABSTRACT

In an image pickup apparatus having an image pickup device and a shutter speed control circuit for controlling a shutter speed of the image pickup device, the shutter speed control circuit is comprised of a circuit for generating a sensor gate pulse in accordance with a vertical scanning timing so as to output an accumulated charge in the image pickup device, a circuit for generating a saw tooth signal being reset to a predetermined voltage level in accordance with the sensor gate pulse, an inclination of the saw tooth signal in just before reset to the predetermined voltage level being larger than the same in just after reset to the predetermined voltage level, a circuit for comparing a voltage level of an output signal of the image pickup device with the saw tooth signal so as to generate a gate pulse, and a circuit for controlling an accumulating period of the image pickup device in accordance with the gate pulse.

2 Claims, 5 Drawing Sheets

SHUTTER SPEED CONTROL CIRCUIT FOR AN IMAGE PICK-UP APPARATUS

BACKGROUND OF THE INVENTION

1. Field of the Invention

The present invention generally relates to image pickup apparatus and, more particularly, to an exposure control apparatus for use with a solid state imager such as a charge-coupled device (CCD) imager or the like.

2. Description of the Prior Art

In a conventional video camera or the like, an auto iris mechanism in which a so-called iris (i.e., stop) housed in a lens is automatically adjusted is known as a mechanism which automatically adjusts a quantity of light received by a so-called CCD (charge-coupled device) sensor, that is, a solid state imager formed of a photo-electric conversion element, the CCD or the like. Japanese Laid-Open Patent Publication No. 63-82067, for example, describes the mechanism which will hereinafter be referred to as an automatic exposure control mechanism.

Figure 1:
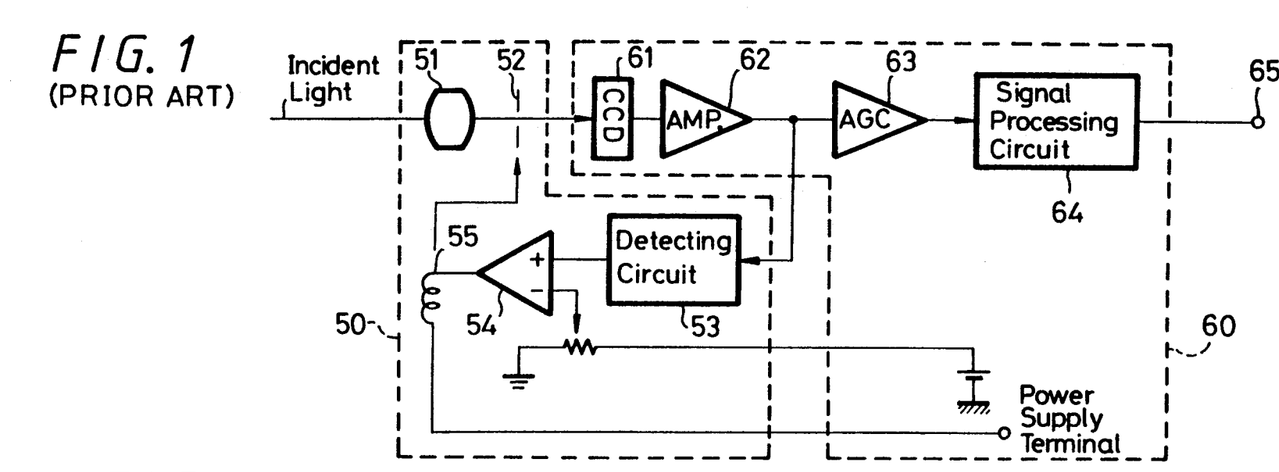
FIG. 1 shows in block form an arrangement of a video camera having an auto-iris mechanism according to the prior art.

More specifically, as shown in FIG. 1, this conventional auto-iris mechanism is generally composed of a lens unit 50 and a video camera body 60.

As shown in FIG. 1, the lens unit 50 is composed of a lens 51, an iris 52, a level detecting circuit 53 for detecting the level of an imager signal supplied from the video camera body 60, a comparing circuit 54 for comparing an output of the detecting circuit 53 with a reference voltage and an iris driving circuit 55 for controlling open and/or close of the iris 52 on the basis of a compared output of the comparing circuit 54.

The video camera body 60 is composed of a CCD image sensor (hereinafter simply referred to as a CCD) 61 which might be a solid state imager, an amplifying circuit 62 for amplifying an imager signal from the CCD 61, an automatic gain control (AGC) circuit 63 for automatically controlling the gain of the imager signal thus amplified by the amplifying circuit 62, and a signal processing circuit 64 for converting the imager signal from the AGC circuit 63 into a video signal conforming to the so-called NTSC or PAL system and so on. The video signal thus converted is developed at a terminal 65.

The auto-iris mechanism achieves its function by feeding the output level of the CCD 61 housed in the video camera body 60 back to the iris 52 housed in the lens unit 50. That is, the iris 52 is automatically controlled to open and/or close in such a fashion that the output level obtained from the CCD 61 through the amplifying circuit 62 and the detecting circuit 53 becomes coincident with the reference voltage, that is, the output of the comparing circuit 54 becomes zero.

Further, as an exposure control mechanism which does not utilizes an iris, the assignee of the present application has previously proposed an electronic shutter mechanism in which, for example, a charge storage time of a CCD image sensor of a so-called field storage type is controlled. This electronic shutter mechanism is described in our co-pending Japanese Patent Application No. 2-238930 (see also U.S. patent application Ser. No. 07/755526).

Figure 2A:
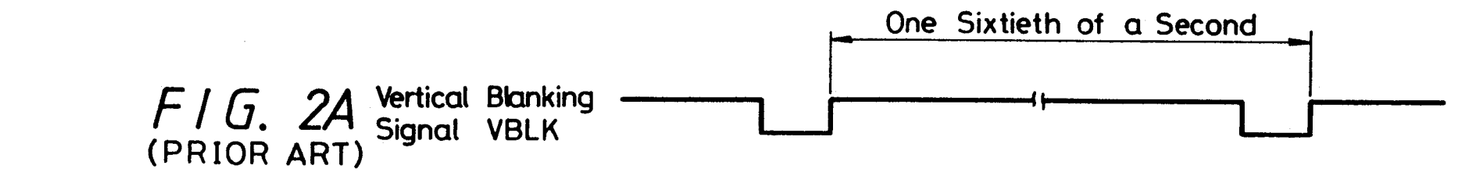
FIGS. 2A through 2E are respectively timing charts used to explain operation of the conventional video camera shown in FIG. 1.
Figure 2B:
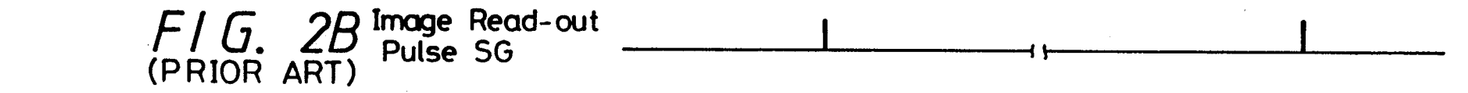

To be more concrete, in the CCD image sensor of the field storage type having the electronic shutter function, an image read-out pulse SG (high level) shown in FIG. 2B is supplied thereto in response to a signal VBLK of low level indicative of a so-called vertical blanking period (hereinafter, referred to as a vertical blanking signal) shown in FIG. 2A, and electric charges stored during the period from the supply of the image read-out pulse SG of an arbitrary field to the image read-out pulse SG of the next field are read out on the basis of the image read-out pulse SG of the next field.

Figure 2C:
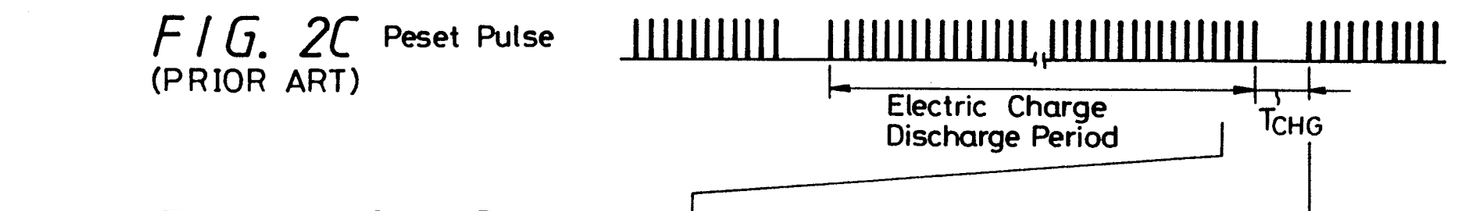
Figure 2D:
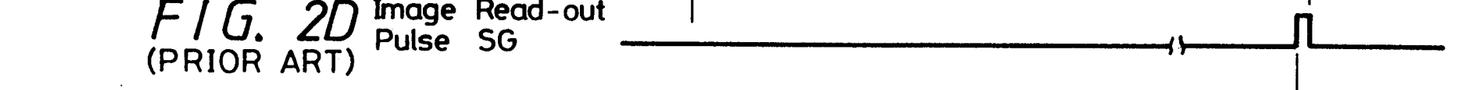

According to the electronic shutter function, as shown in FIG. 2C, after the image read-out pulse SG of an arbitrary field is supplied, a high level pulse (hereinafter referred to as a reset pulse) SUB is supplied to a so-called substrate of the CCD image sensor during a so-called horizontal blanking period to discharge electric charges stored up to that time to thereby control a time period from the supply of the last reset pulse SUB to the supply of the image read-out pulse SG of the next field, thus an electric charge storage time $T_{CHG}$ being controlled. For example, in the NTSC system, the maximum electric charge storage time $T_{CHG}$ is 16.7 milliseconds determined by the field frequency, whereas in the PAL system the maximum electric charge storage time $T_{CHG}$ is 20 milliseconds determined by the field frequency.

An industrial video camera, for example, utilizes many interchangeable lenses based on a so-called C mount system and lenses of the video camera body can be freely combined in use. However, the auto-iris lens employing the above-mentioned auto iris mechanism has various problems of the interconnection (interface) with the video camera body. For example, there are disadvantages such as compatibility of a connector for connecting the auto iris lens and the video camera body, the matching of standards such as power source voltage supplied to the auto iris lens from the video camera body, current capacity, level of feedback signal or the like.

Further, as shown in FIG. 1, the detecting circuit 53, the comparing circuit 54 and so on are housed within the lens unit 50 so that, each time the lens unit 50 is exchanged, then the reference voltage or the like must be adjusted in the lens unit 50 so as to obtain an optimum exposure.

Further, the auto-iris lens is expensive as compared with a manual iris lens whose iris must be adjusted in a manual fashion and the interconnection work via the cable is cumbersome.

Figure 2E:
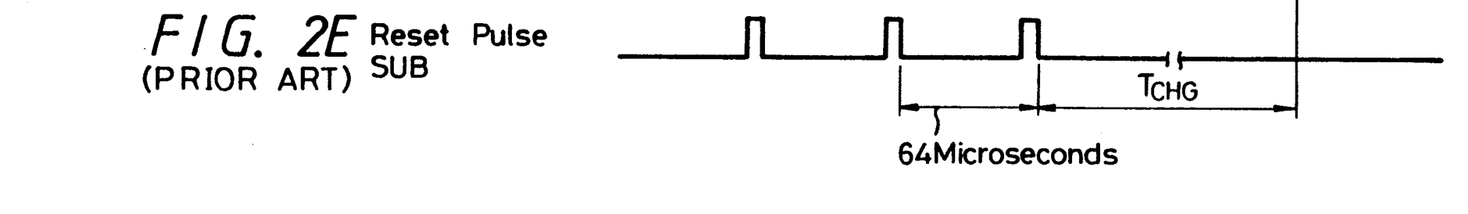

Furthermore, in the exposure time control done by the application of the electronic shutter function, the reset pulse SUB for discharging stored electric charges must be supplied during the horizontal blanking period so as not to affect the image signal now read-out. As a consequence, as shown in FIG. 2E, the electric charge storage time $T_{CHG}$ is controlled in the unit of time corresponding to one period of a so-called horizontal synchronizing signal (hereinafter referred to as a 1H), that is, in the unit of 64 microseconds. Accordingly, in a low speed shutter region in which an object is dark and a shutter speed is slow, the electric charge storage time $T_{CHG}$ can be controlled stepwise without causing any trouble. Conversely, in the high speed shutter region in which the object is bright and the shutter speed is fast, the step width is so coarse that this method is not suitable in practice.

In this case, the highest shutter speed which can be controlled by the conventional electronic shutter is about 1/10000 second so that, if the shutter speed is increased more, then the incident light amount cannot be satisfactorily controlled when the cameraman takes a picture in actual practice.

As described above, only by controlling the shutter speed, it is difficult to adjust sensitivity upon taking a picture.

OBJECTS AND SUMMARY OF THE INVENTION

Accordingly, it is an object of the present invention to provide an improved exposure control apparatus for a video camera in which the aforementioned shortcomings and disadvantages encountered with the prior art can be eliminated.

More specifically, it is an object of the present invention to provide an exposure control apparatus for a video camera in which the shutter speed can be controlled at high accuracy.

It is another object of the present invention to provide an exposure control apparatus for a video camera in which exposure can be controlled at high accuracy even when the shutter speed is very high.

It is a further object of the present invention to provide an exposure control apparatus for a video camera which can be suitably applied to a video camera utilizing an image pickup lens of a so-called manual iris.

As an aspect of the present invention, in an image pickup apparatus having an image pickup device and a shutter speed control circuit for controlling a shutter speed of the image pickup device, the shutter speed control circuit is comprised of a circuit for generating a sensor gate pulse in accordance with a vertical scanning timing so as to output an accumulated charge in the image pickup device, a circuit for generating a saw tooth signal being reset to a predetermined voltage level in accordance with the sensor gate pulse, an inclination of the saw tooth signal in just before reset to the predetermined voltage level being larger than the same in just after reset to the predetermined voltage level, a circuit for comparing a voltage level of an output signal of the image pickup device with the saw tooth signal so as to generate a gate pulse, and a circuit for controlling an accumulating period of the image pickup device in accordance with the gate pulse.

In accordance with a second aspect of the present invention, in an image pickup apparatus having an image pickup device and a shutter speed control circuit for controlling a shutter speed of the image pickup device, the shutter speed control circuit is comprised of a circuit for generating a sensor gate pulse in accordance with a vertical scanning timing so as to output an accumulated charge of the image pickup device, and a circuit for generating a signal the voltage level of which changes in accordance with an output signal of the image pickup device and a change rate of the voltage level of the signal is becoming smaller in accordance with an increase of a voltage level of the output signal of the image pickup device.

The preceding and other objects, features and advantages of the present invention will become apparent from the following detailed description of an illustrative embodiment thereof to be read in conjunction with the accompanying drawings, in which like reference numerals are used to identify the same or similar parts in the several views.

DESCRIPTION OF THE PREFERRED EMBODIMENT

An embodiment of the present invention will now be described with reference to FIGS. 3 to 6.

Figure 3:
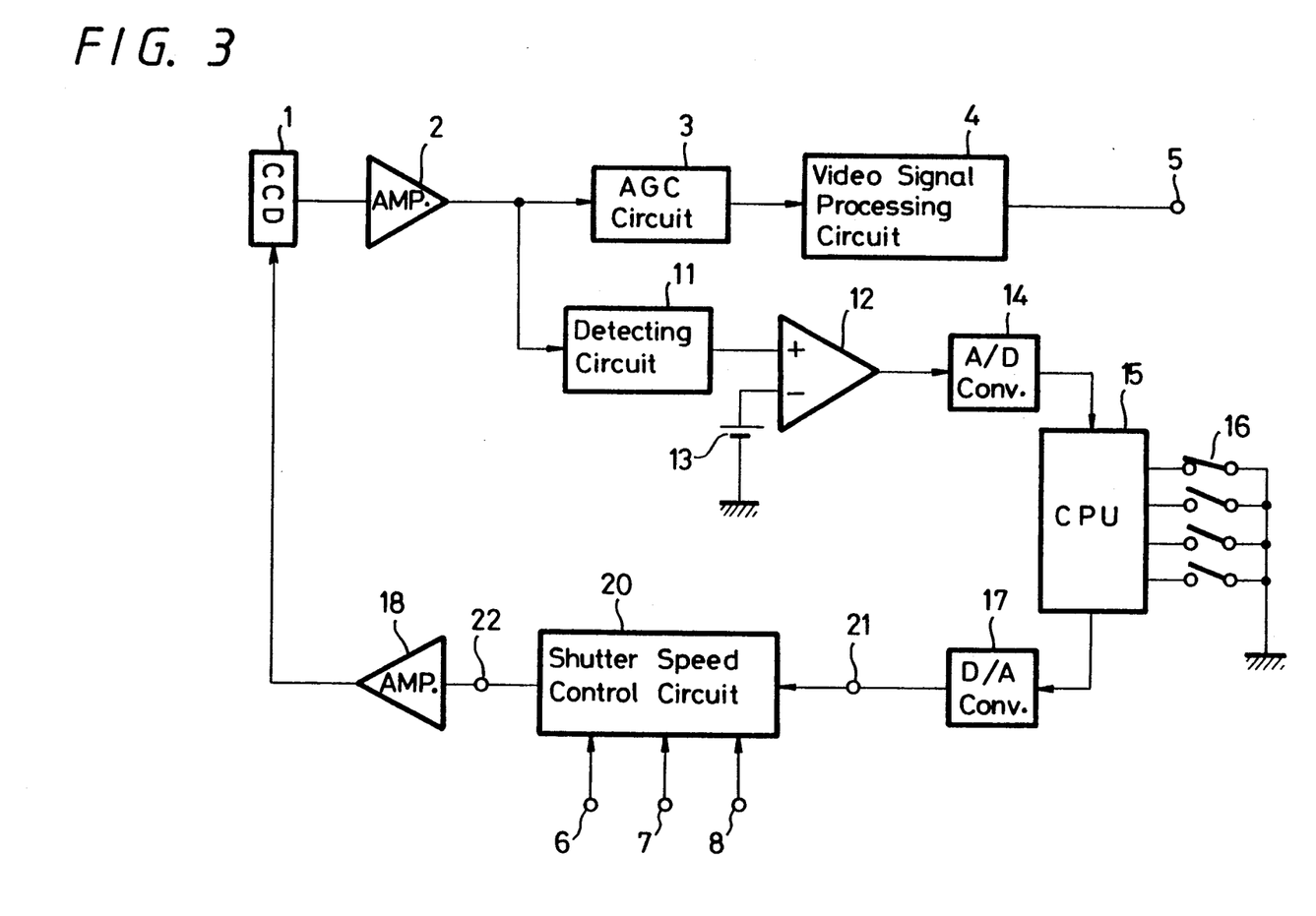
FIG. 3 is a block diagram showing an overall arrangement of an embodiment of an exposure control circuit according to the present invention.

FIG. 3 shows a block diagram of a video camera to which an embodiment of the exposure control circuit of a solid state imager according to this invention is applied.

In FIG. 3, reference numeral 1 designates a solid state imager (hereinafter simply referred to as a CCD) whose electric charge storage time can be controlled. This CCD 1 stores an image light incident thereon through an imager lens (not shown) in the form of electric charge at every pixel and outputs the stored electric charge as an electrical imager signal. The electric charge storage time is controlled by a reset pulse SUB which will be described later. The imager signal from the CCD 1 is amplified by an amplifying circuit 2 and then controlled to be a predetermined level by an automatic gain control circuit (AGC circuit) 3. Then, the imager signal from the AGC circuit 3 is supplied to a video signal processing circuit 4 and is converted by this video signal processing circuit 4 into a video signal of a predetermined format such as an NTSC system or the like. The video signal thus converted is supplied to a variety of video appliances such as a monitor receiver, a video tape recorder (VTR) or the like through an output terminal 5.

In this embodiment, the imager signal from the amplifying circuit 2 is supplied to a detecting circuit 11 and the image signal is peak-detected (or detected in a mean value) by this detecting circuit 11. The detected output from the detecting circuit 11 is supplied to a comparator 12. Then, the detected output is compared with an output potential of a reference voltage generating circuit 13 by this comparing circuit 12, and a difference therebetween is supplied to an analog-to-digital (A/D) converter 14. The difference signal from the comparator 12 will hereinafter be referred to as a shutter control voltage.

The shutter control voltage thus converted to digital data by the A/D converter 14 is supplied to a central processing unit (CPU) 15 which is formed of a microcomputer. This CPU 15 is connected with a mode switch 16 and corrects the shutter control voltage data by an exposure control mode instructed by the mode switch 16 and the shutter control voltage data thus corrected is supplied to a digital-to-analog (D/A) converter 17 in the form of a pulse-width-modulated wave (PWM wave), in which it is converted into an analog voltage signal. In that case, the PWM wave output from the CPU 15 is generated so as to have a nonlinear characteristic relative to the input shutter control voltage data.

The nonlinear characteristic will be described below.

Assuming that $D_P$ represents a value indicated by the PWM wave, then the maximum changed amount $\Delta D_P$ of the PWM value $D_P$ per unit time is set by the following equation:

$$\Delta D_P = k/D_P \qquad (1)$$

where k is the constant. By setting the changing amount of the PWM value $D_P$ on the basis of the equation (1), the maximum changing amount $\Delta D_P$ can be increased if the PWM value $D_P$ is a value of relatively low level and the maximum changing amount $\Delta D_P$ can be suppressed if it is a value of relatively high level.

Figure 4:
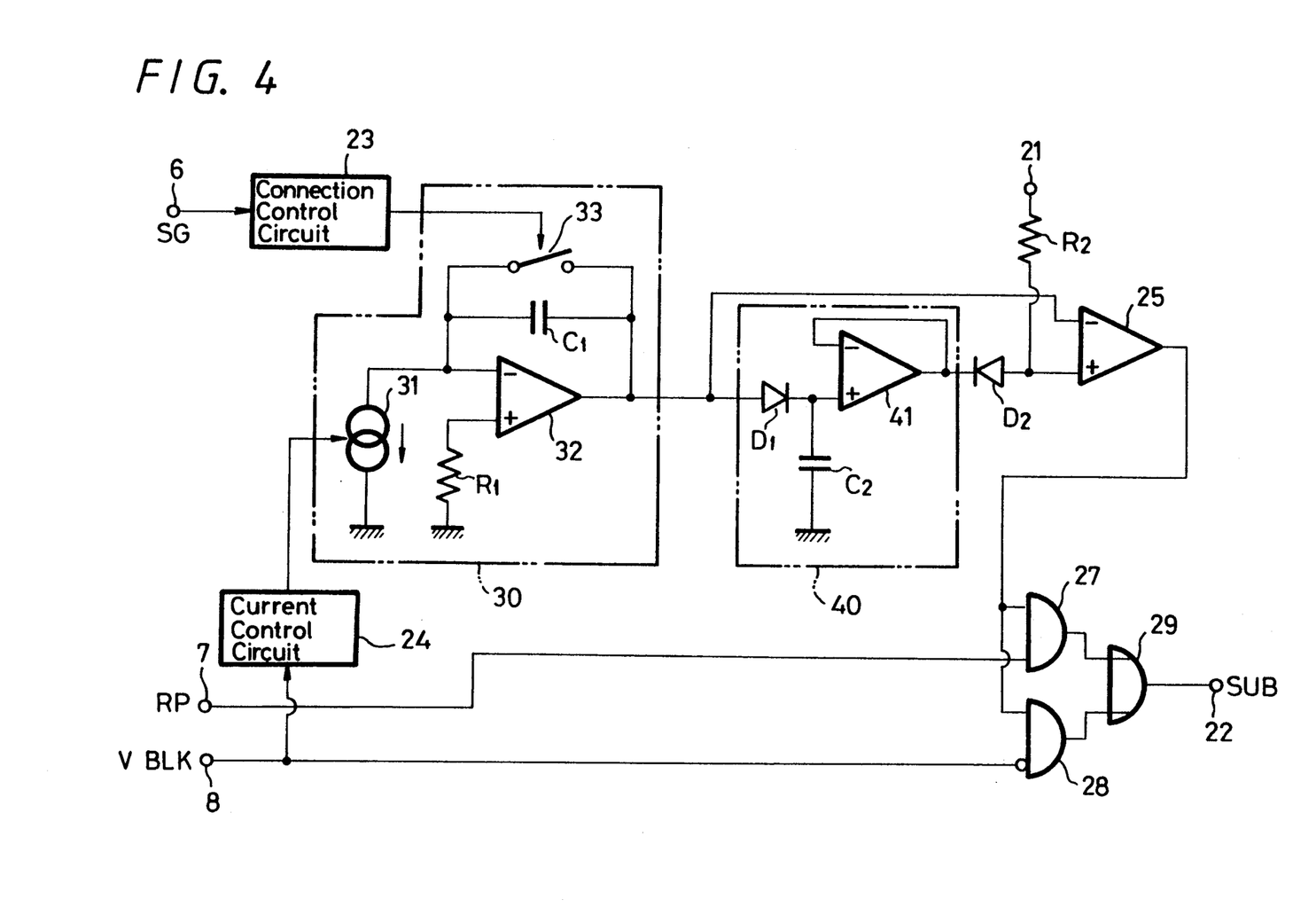
FIG. 4 is a block diagram showing an arrangement of the main portion of the embodiment of the present invention.

Then, a voltage signal, which results from converting the PWM wave, that is, the shutter control voltage data in the form of analog data, is supplied to a shutter speed control circuit 20 through a terminal 21. The shutter speed control circuit 20 is constructed as shown in FIG. 4, which is supplied with a image read-out pulse SG from a terminal 6, a reset pulse RP from a terminal 7 and a vertical blanking signal VBLK from a terminal 8. The shutter speed control circuit 20 includes a saw tooth wave generating circuit 30, and in this saw tooth wave generating circuit 30, an output of a constant current source 31 is supplied to an inverting input terminal of an operational amplifier 32 and a noninverting input terminal of the operational amplifier 32 is grounded via a resistor $R_1$. In this case, the output current value of the constant current source 31 is controlled by a current control circuit 24 which will be described later. The inverting input terminal of this operational amplifier 32 is connected to an output terminal of the operational amplifier 32 via a capacitor $C_1$ and a connection switch 33 is connected to the capacitor $C_1$ in parallel. This connection switch 33 is controlled by a connection control circuit 23.

This connection control circuit 23 is supplied with the image read-out pulse SG from the terminal 6 and generates a connection control signal which connects the connection switch 33 thereto in response to the image read-out pulse SG from the terminal 6. In this case, the image read-out pulse SG is a pulse supplied to the connection control circuit 23 at every field of the video signal and supplied at the beginning of each field with the result that the connection switch 33 is temporarily placed in the connected state at the beginning of each field.

The vertical blanking signal VBLK supplied from the terminal 8 is supplied to the current control circuit 24 and the constant current source 31 is controlled by the current control circuit 24 in such a manner that the output current value is increased by a predetermined value only during the vertical blanking period.

Figure 5A:
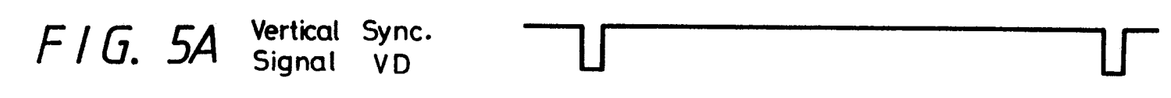
FIGS. 5A through 5H are respectively timing charts used to explain the embodiment of the present invention.
Figure 5B:
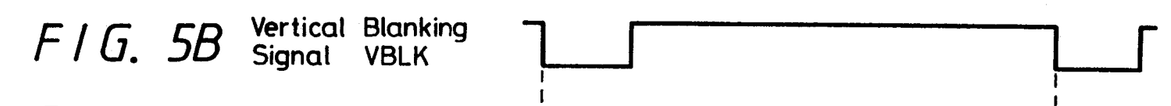
Figures 5C, 5D, 5E:
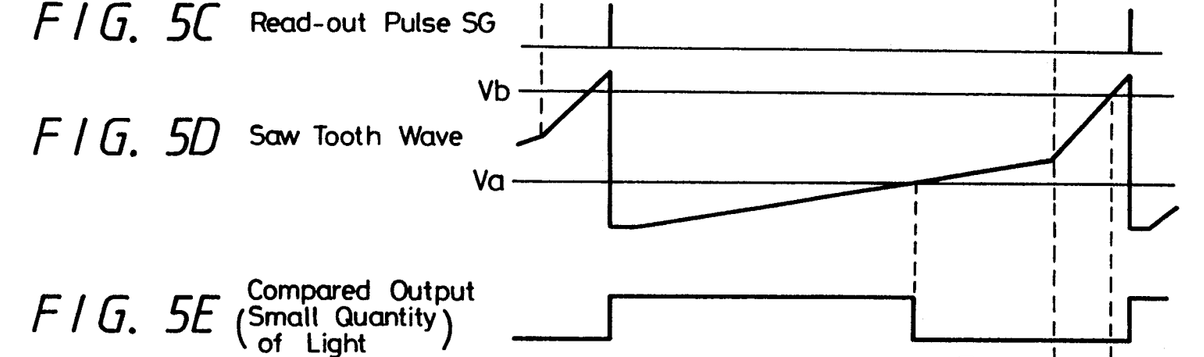

The saw tooth wave generating circuit 30 is constructed as described above so that it can derive a saw tooth wave in which an output potential is increased each time the connection switch 33 is placed in the connected state (i.e., at every field) and instantly returned to the original potential after having reached to the predetermined potential. In this case, since the output current value of the constant current source 31 by the vertical blanking period VBLK is increased as compared with that during other period according to this embodiment, as shown in FIG. 5D, the increasing ratio of this potential is increased (i.e., an inclination in which the potential is changed becomes steep) when the output potential is increased more than a predetermined value during the vertical blanking period.

The resultant saw tooth wave is supplied to the inverting input terminal of a comparator 25 and also fed to a detecting circuit 40. The detecting circuit 40 is adapted to detect a peak value wherein the output of the saw tooth wave generating circuit 30 is supplied to the anode of a diode $D_1$ and the cathode of the diode $D_1$ is connected to a noninverting input terminal of an operational amplifier 41. The cathode of the diode $D_1$ is grounded via a capacitor $C_2$, and an output terminal of the operational amplifier 41 is connected to the inverting input terminal thereof. Further, the shutter control voltage developed at the terminal 21 is supplied through a resistor $R_2$ to the anode of the diode $D_2$, and the output terminal of the operational amplifier 41 is connected to the cathode of the diode $D_2$. The anode of the diode $D_2$ is connected to the noninverting input terminal of the comparator 25.

Figure 6:
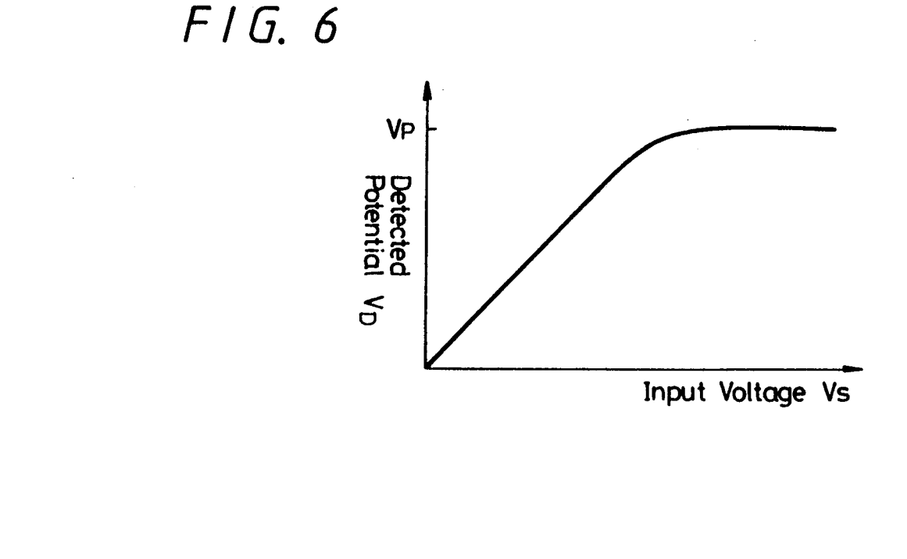
FIG. 6 is a characteristic graph used to explain the embodiment of the present invention.

Since the shutter speed control circuit of this embodiment is constructed as described above, the peak level of the saw tooth wave from the saw tooth wave generating circuit 30 is detected by the detecting circuit 40 and the shutter control voltage is converged to the peak-detected level in a nonlinear fashion. That is, due to the nonlinear characteristic of the diode $D_2$ connected between the input side of the shutter control voltage and the detecting circuit 40, as shown in FIG. 6, if the input voltage (shutter control voltage) $V_S$ at the terminal 21 is low in level, the anode potential $V_D$ of the diode $D_2$ is changed in accordance with the change of the input voltage $V_S$. Whereas, if the input voltage $V_S$ approaches the peak $V_P$ of the saw tooth wave, then the potential $V_D$ is changed with a delay time due to the nonlinear characteristic of the diode $D_2$.

The comparator 25 compares the shutter control voltage developed at the anode of the diode $D_2$ and the saw tooth wave to produce a detecting signal which changes when the shutter control voltage exceeds the level of the saw tooth wave. This detecting signal is supplied to one input terminals of AND gates 27 and 28 as a gate pulse, whereby a logical product of this gate pulse and the reset pulse RP supplied to the other input terminal of the AND gate 27 from the terminal 7 and a logical product of negative logical value of the vertical blanking signal VBLK supplied to the other input terminal of the AND gate 28 from the terminal 8 an the gate pulse are respectively obtained at the AND gates 27 and 28. Then, the logical product outputs of the two AND gates 27 and 28 are supplied to one and the other input terminals of an OR gate 29 to thereby obtain a logical sum output. This logical sum output is fed to the output terminal 22 as the reset pulse SUB.

This reset pulse SUB developed at the terminal 22 is supplied through a driving circuit 18 to the CCD 1 (see FIG. 3) and electric charges stored in the CCD 1 are discharged in response to the reset pulse SUB.

Operation of the video camera according to this embodiment will be described below, highlighting the control of the shutter speed with reference to FIGS. 5A to 5H.

If a picture of an object is taken in synchronism with the vertical synchronizing signal VD shown in FIG.

5A, then the vertical blanking signal VBLK (see FIG. 5B) and the image read-out pulse SG (see FIG. 5C) are generated on the basis of the vertical synchronizing signal VD and electric charges stored in the CCD 1 are read out at every vertical period in synchronism with the image read-out pulse SG. Then, as shown in FIG. 5D, the saw tooth wave generated from the saw tooth wave generating circuit 30 within the shutter speed control circuit 20 is synchronized with the image read-out pulse SG and the vertical blanking signal VBLK goes to low level signal "0" with the result that the increasing ratio of the potential is increased during the vertical blanking period.

When the potential of the saw tooth wave is lower than the shutter control voltage, then the output of the comparator 25 goes to high level signal "1". Accordingly, the pulse duration of the high level signal "1" output from the comparator 25 is successively (in an analog fashion) controlled by the shutter control voltage so that, if the object becomes bright and the shutter control voltage is increased, then the pulse duration of the high level signal "1" is increased.

Figures 5F, 5G:
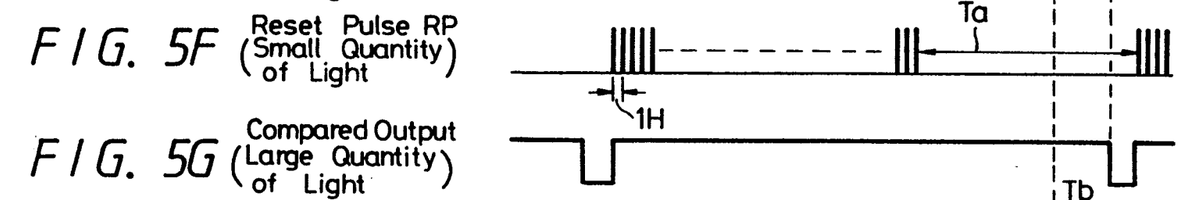
Figure 5H:
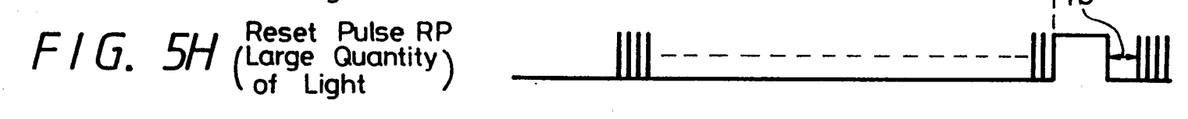

As shown in FIGS. 5F or 5H, the reset pulse RP supplied through the terminal 7 is a signal synchronized with the horizontal synchronizing signal and which goes to high level signal during the horizontal blanking period so as not to affect the imager signal now being read-out. Then, the AND gate 27 opens to pass therethrough the reset pulse RP when the output of the comparator 25 is at high level. While, the AND gate 28 is opened to pass therethrough the negative logic value of the vertical blanking period VBLK supplied thereto through the terminal 8 and which is illustrated in FIG. 5B when the output of the comparator 25 is high in level.

Accordingly, the OR gate 29 outputs the reset pulse RP as the reset pulse SUB during the period in which the object, for example, is dark, the shutter control voltage is low and the high level period of the output from the comparator 25 is shorter than the high level period of the vertical blanking period VBLK, that is, so-called video period (hereinafter referred to as a low speed shutter region). More specifically, in the low speed shutter region, the OR gate 29 outputs the reset pulse SUB which is controlled in the unit of 1H (i.e., one horizontal period). For example, when the comparator 25 generates the compared output (see FIG. 5E) which is changed to low level during the video period in the comparison of the shutter control voltage Va (see FIG. 5D) and the saw tooth wave, then the output of the reset pulse RP is stopped from a timing point at which the compared output is changed to the low level as shown in FIG. 5F, and electric charges are stored during a period Ta from the stop of the reset pulse RP to a timing point at which the image read-out pulse SG rises next. This storage period Ta becomes a time period corresponding to the shutter speed.

When on the other hand the shutter control voltage is high and the high level period of the output from the comparator 25 is longer than the video period (hereinafter referred to as a high speed shutter region), the reset pulse RP is output during the video period and the reset pulse SUB of high level is output during the period in which the output of the comparator 25 is high in level in the vertical blanking period. That is, in the high speed shutter region, the OR gate 29 outputs the reset pulse SUB which is controlled successively. For example, when the comparator 25 generates a compared output (see FIG. 5G) which is changed to the low level during the vertical blanking period in the comparison of the shutter control voltage Vb (see FIG. 5D) and the saw tooth wave, as shown in FIG. 5H, the pulse is output as the reset pulse RP during the vertical blanking period and the duration of this pulse is changed in response to the compared output. Then, electric charges are stored during the period Tb in which the next image read-out pulse SG rises after the pulse was changed to the low level. This storage time Tb becomes a time period corresponding to the shutter speed.

As set out above, the shutter speed control circuit 20 supplies the substrate of the CCD 1 through the driving circuit 18 with the reset pulse SUB controlled in the unit of 1H during the video period in the low speed shutter region in which the object is dark and the output level of the CCD 1 is detected to be low by the detecting circuit 11 and controls in the unit of 1H the electric charge storage time in which the next image read-out pulse is supplied after the final reset pulse SUB was supplied. On the other hand, in the high speed shutter region in which the object is bright and the output level of the CCD 1 is detected to be high by the detecting circuit 11, the reset pulse SUB successively controlled on the basis of the output level of the CCD 1 is supplied through the driving circuit 18 to the substrate of the CCD 1 during the vertical blanking period in which the read-out operation of the imager signal is not affected at all, to thereby successively control the electric charge storage time in which the next image pulse SG is supplied after the final reset pulse SUB was supplied.

Then, the imager signal from the CCD 1 whose electric charge storage time is controlled, that is, the imager signal whose exposure is automatically controlled in response to the brightness of the object is converted into the video signal based on the NTSC system or the like and this video signal is fed to the terminal 5.

According to this embodiment, since the saw tooth wave compared with the shutter control voltage in the high speed shutter region (i.e.,, during the vertical blanking period) is arranged to have a large inclination in which the increasing ratio of the potential is large as compared with the saw tooth wave compared in the low speed shutter region, the high speed shutter region has a higher resolution as compared with the low speed shutter region. Accordingly, in the high speed shutter region, the brightness of the object can be detected at high resolution and the shutter speed can be controlled at high accuracy. Further, the peak level of the saw tooth wave is detected and the shutter control voltage is converged to the value thus peak-detected in the nonlinear fashion as described above so that, when the shutter control voltage lies near the peak value of the saw tooth wave, the rapid fluctuation can be suppressed. Therefore, the shutter speed can be prevented from being fluctuated rapidly when the shutter speed is very high so that the exposure can be controlled at high accuracy in the very high shutter speed. Furthermore, when the shutter control voltage data is PWM-detected by the CPU 15, the shutter control voltage data is converted in the nonlinear characteristic so that the exposure can be controlled at high accuracy in the considerably high shutter speed from this viewpoint.

According to the present invention, even when the object is very bright and the shutter speed is very high, the exposure can be controlled smoothly and properly, thereby making it possible to enlarge a range of the quantity of an incident light which can be applied to the so-called electronic shutter utilizing the CCD. Therefore, the cameraman can take a picture satisfactorily by using a video camera which utilizes an imager lens of so-called manual iris in which the iris is fixed.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. An image pickup apparatus having an image pickup device and a shutter speed control circuit for controlling the shutter speed of said image pickup device, said shutter speed control circuit comprising:
   (a) means for generating a sensor gate pulse in accordance with a vertical scanning timing so as to produce an output of the accumulated charges in said image pickup device;
   (b) means for generating a saw tooth signal which is periodically reset to a predetermined voltage level by said sensor gate pulse, and the slope of said saw tooth signal during one field before being reset to said predetermined voltage level is greater than the slope after being reset to said predetermined voltage level;
   (c) means for comparing the voltage level of the output signal of said image pickup device with said saw tooth signal so as to generate a reset gate pulse; and
   (d) means for controlling the period of accumulating charges of said image pickup device by said shutter speed control circuit as a function of said reset gate pulse.

2. The image pickup apparatus according to claim 1, in which the inclination of said saw tooth pulse is changed as a function of a vertical blanking pulse.

* * * * *